April 16, 1968 R. REICH 3,377,969
EMBROIDERY MACHINE
Filed Oct. 21, 1965 9 Sheets-Sheet 1

Inventor
Rudolf Reich
By: [signature]
Attorney

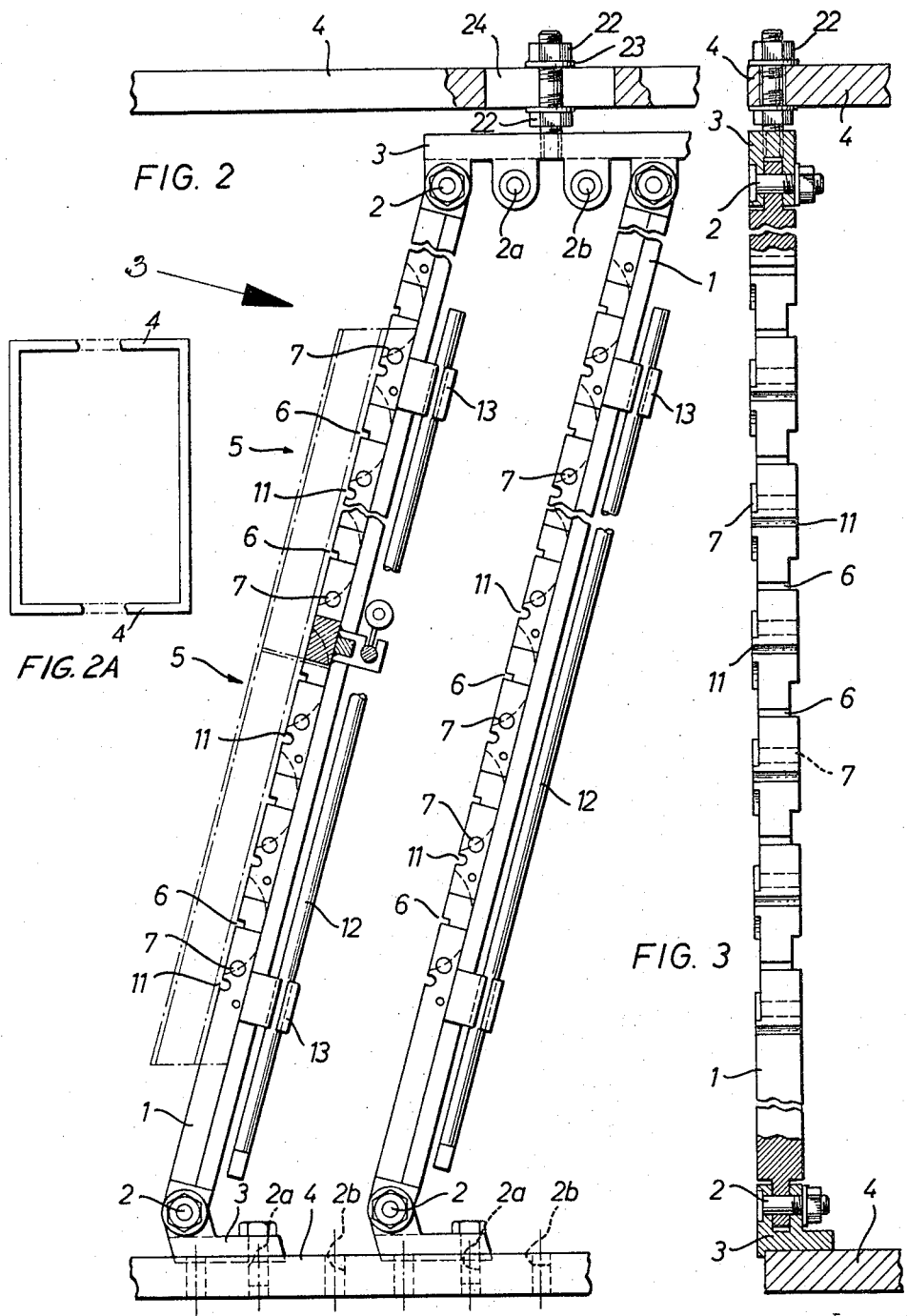

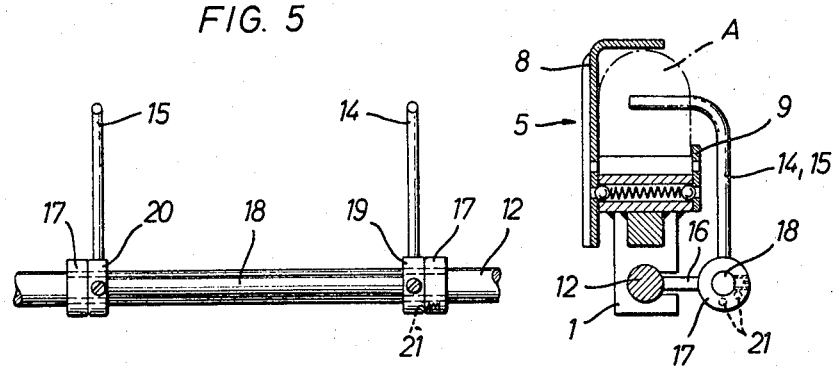
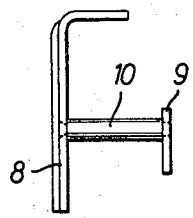
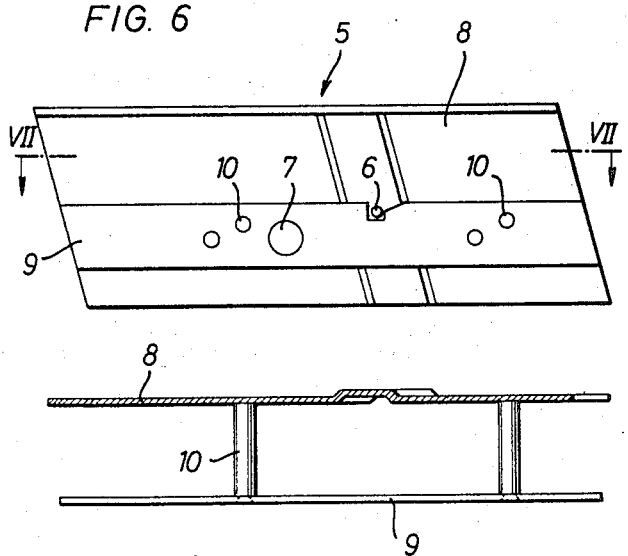

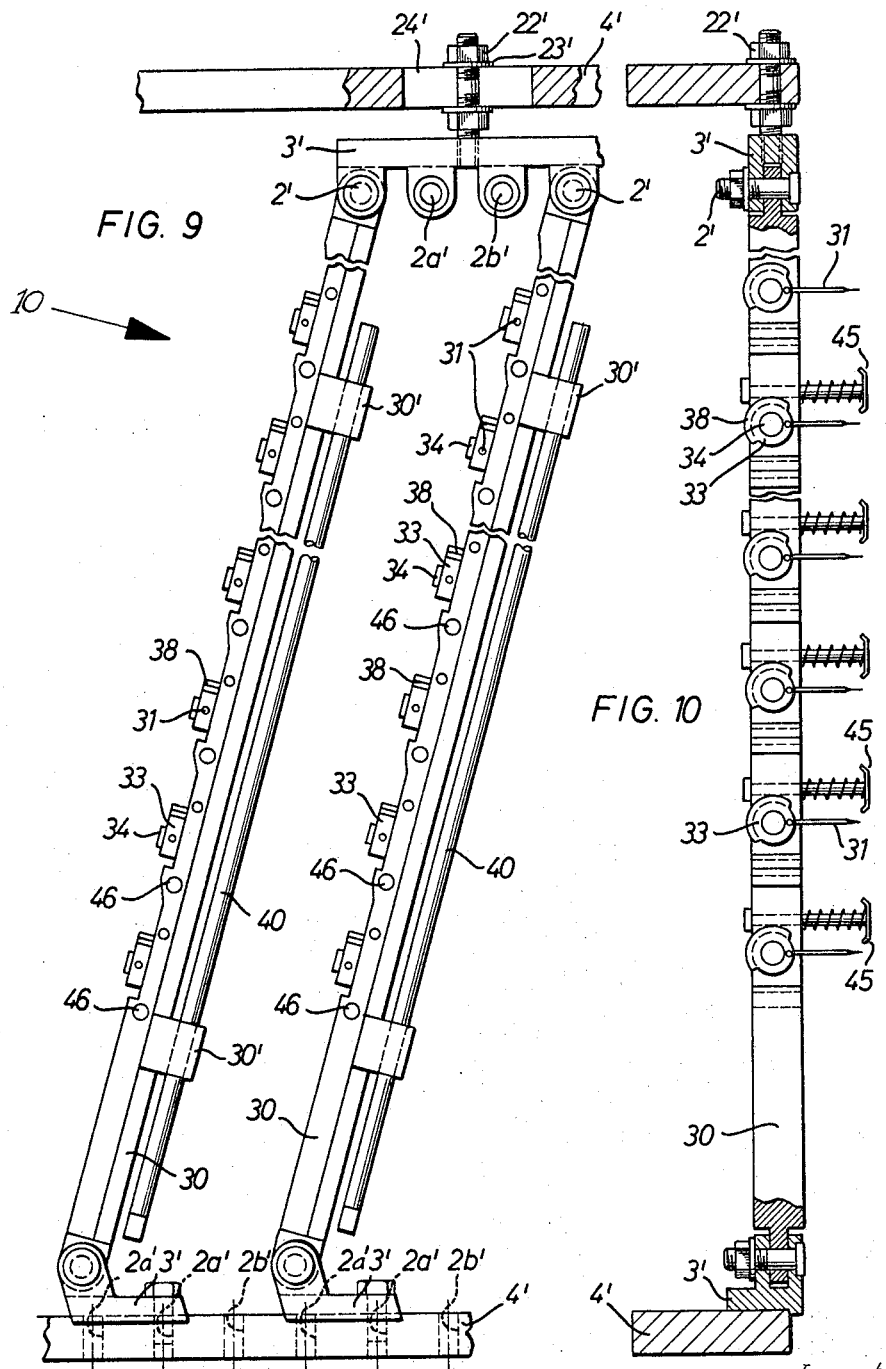

April 16, 1968  R. REICH  3,377,969
EMBROIDERY MACHINE
Filed Oct. 21, 1965                              9 Sheets-Sheet 5

Inventor
Rudolf Reich
By: [signature]
Attorney

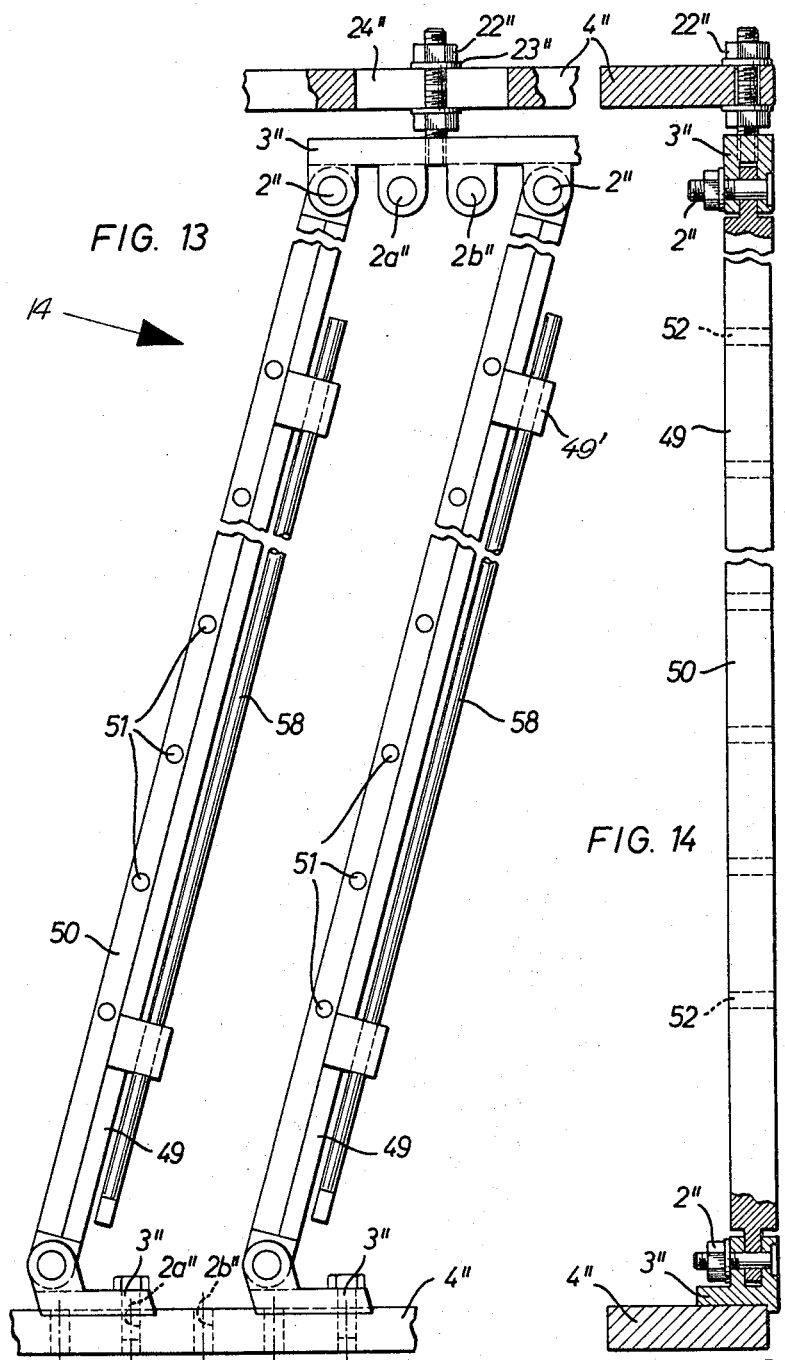

April 16, 1968     R. REICH     3,377,969

EMBROIDERY MACHINE

Filed Oct. 21, 1965     9 Sheets-Sheet 7

Inventor
Rudolf Reich
By: *[signature]*
Attorney

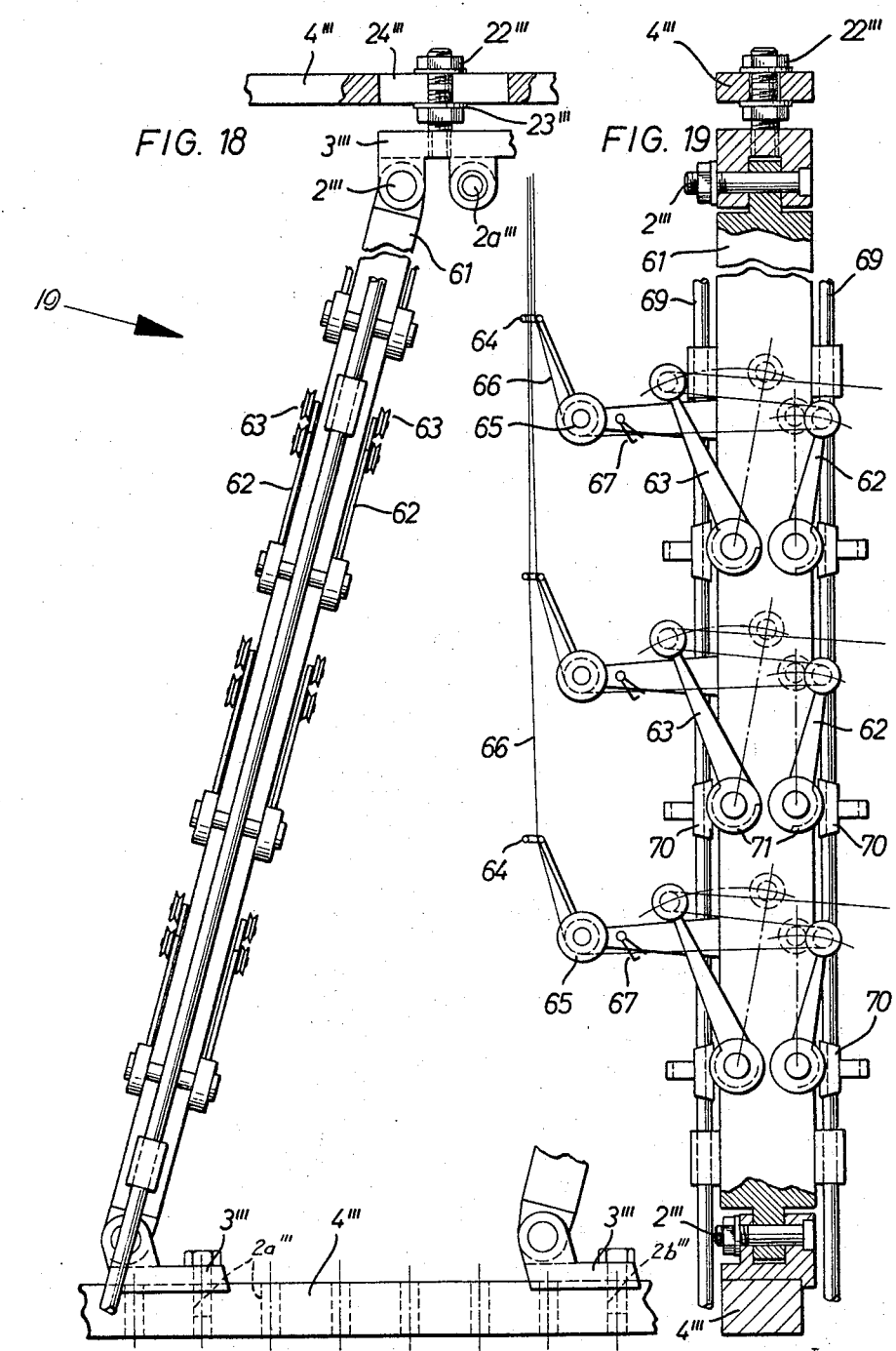

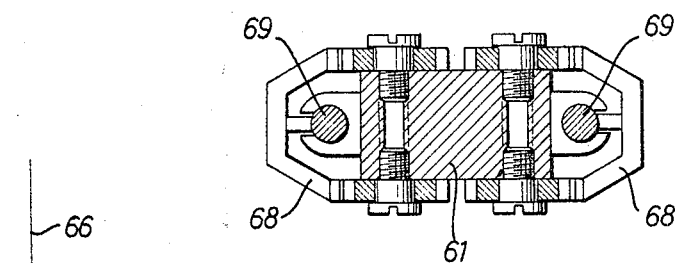
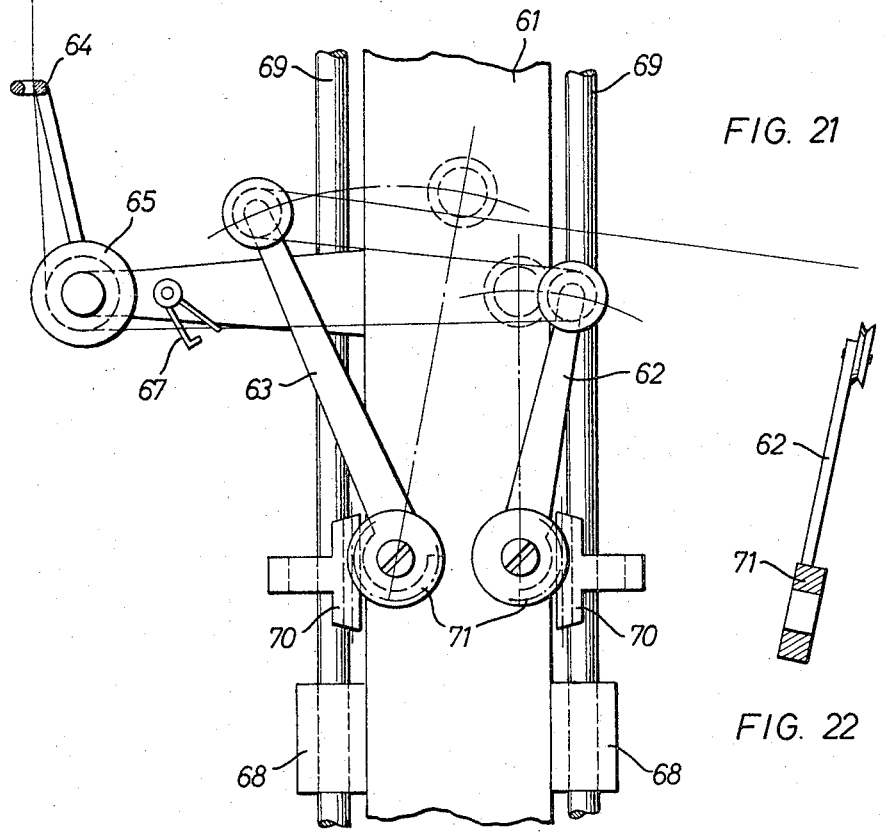
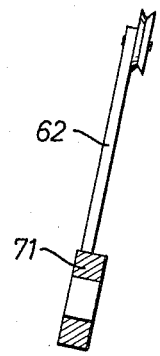

United States Patent Office 3,377,969
Patented Apr. 16, 1968

3,377,969
EMBROIDERY MACHINE
Rudolf Reich, 6 An der Ringstrasse,
Neuwied, Germany
Filed Oct. 21, 1965, Ser. No. 499,411
Claims priority, application Germany, Oct. 23, 1964,
R 39,081
13 Claims. (Cl. 112—83)

ABSTRACT OF THE DISCLOSURE

The disclosure deals with an embroidery machine for simultaneously embroidering a tentered fabric over its entire width and length with a design pattern arranged in laterally spaced longitudinal rows, and the machine provides to this end as many frames as there are different types of embroidering tools, with the frames extending in spaced planes parallel to each other and to the tentered fabric, and the different types of embroidering tools being mounted on different sets of base bars, respectively, of which the base bars of each set are, in turn, mounted in one frame and extend parallel to the pattern rows.

---

Figure 1:
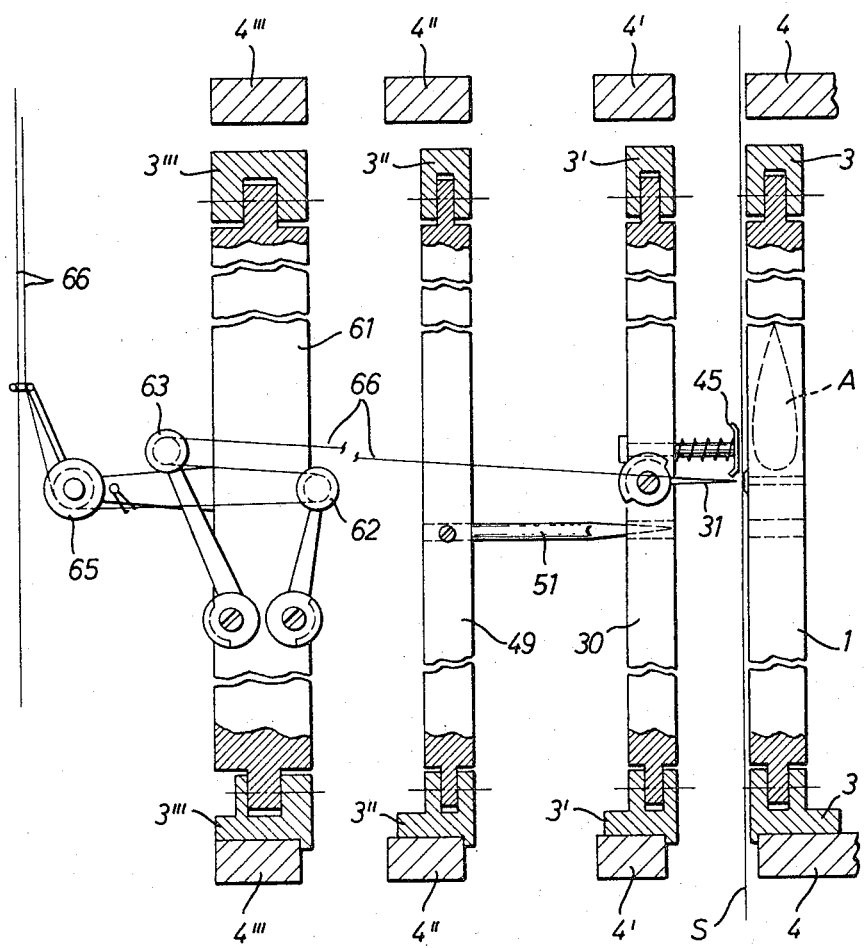

This invention relates to an embroidery machine with embroidery tool banks.

Embroidery machines with two embroidery tool banks are known with which it is possible to embroider two pattern or repeat rows simultaneously on to the surface of the length of fabric stretched in a tenter. To complete embroidering of the total area of tentered fabric it has been necessary to displace the tenter or the embroidery tools in each case by the width of the two embroidered pattern rows, until the entire tentered fabric surface has been embroidered, which was awkward and time consuming. Moreover a special mounting and guide was necessary for each embroidery tool in each tool bank.

The object of the invention is to greatly improve the output of an embroidery machine by embroidering the total area of the tentered fabric simultaneously over its total length and width with an appropriate number of pattern or repeat rows. According to the invention, this is achieved by providing the embroidery machine with a number of embroidery tool banks appropriate for the area of fabric stretched for embroidering in the tenter, for simultaneous embroidering of the total fabric surface over its entire length and width. This dispenses with any need for displacement between the surface of fabric stretched in the tenter and the embroidery tool banks, so that by embroidering larger surfaces the output of the machine can be greatly increased.

Further, the various embroidering tools, such as needles, shuttles, punches and thread regulators, may be carried by mutually parallel base bars extending over all pattern rows of the tentered fabric area and secured in frames which also extend parallel to the tentered fabric, with a frame being provided for each type of embroidery tool. The appropriate patterns of the pattern rows are either above each other or offset from each other, depending on whether the base bars with the embroidery tools lie exactly in the direction in which the fabric is pulled through the tenter or are inclined thereto.

According to a further feature of the invention, the base bars may extend transversely of the pattern rows in a rectangular frame. They can be located between parallel frame sides to give angular adjustment to the pattern rows, so that the extent of the offset pattern displacement can be set on the individual pattern rows.

On the embroidering machine according to the invention all embroidery tools, i.e., the shuttles, needles, punches, and thread regulators, are provided on base bars in independent frames, so that there are in all four such frames. Two end frames, specifically the one with the shuttles and the one with the thread regulators, may be located in a fixed location in preferably interchangeable fashion, the section of fabric stretched in the tenter for embroidering being supported against the shuttle base bar preferably by means of a needle plate. During the embroidering process the tenter is moved back and forth in accordance with the embroidering pattern by a patterning mechanism such as, for example, a pattern chain or punched card.

The frame carrying the needles is reciprocated relative to the shuttle frame, by a punched card, for example, in order that the needles may penetrate the fabric and form thread loops on its reverse side for the shuttles to pass through. In the same manner the frame lying behind the needle frame and carrying the punches is reciprocated in order that the latter will penetrate the fabric and form holes which are to be embroidered around the edge as part of the pattern, holes for passage of the punches being provided in the needle base bars. After simultaneous embroidering of the entire section of fabric stretched in the tenter the fabric is moved forward by an appropriate length.

Figure 11:
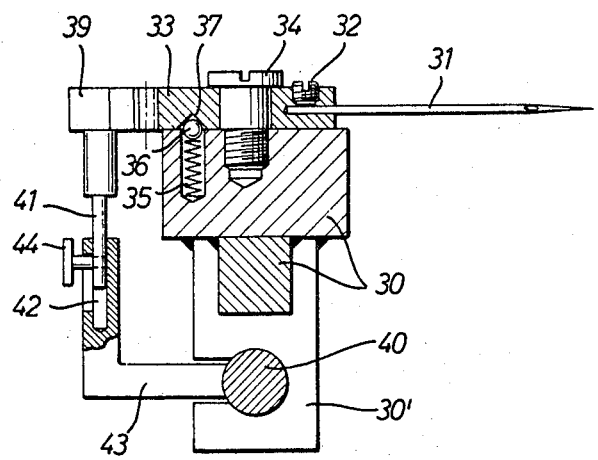
Figure 12:
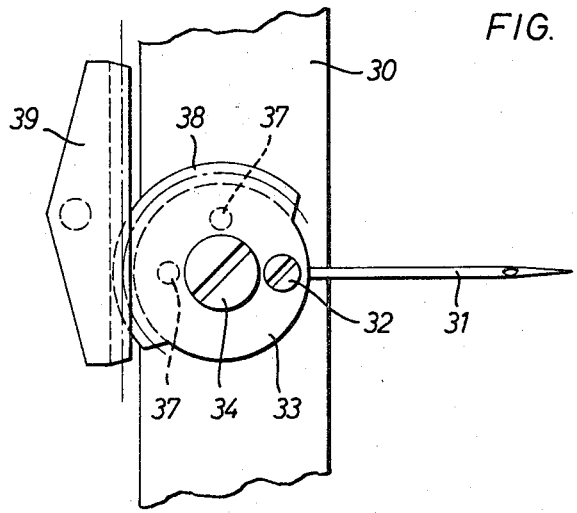
Figure 15:
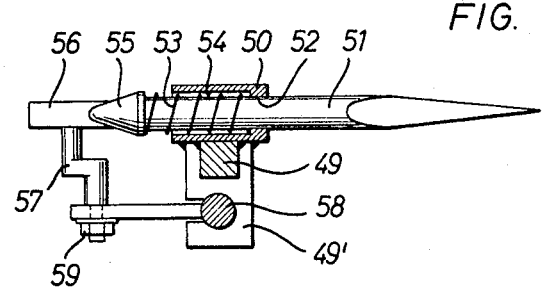
Figure 16:
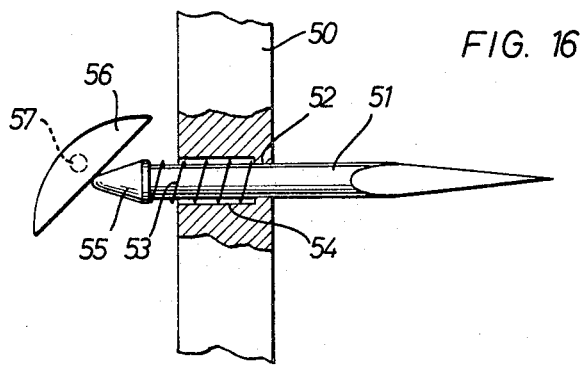
Figure 17:
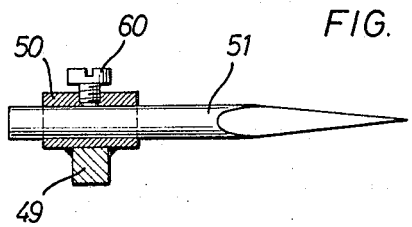

One embodiment of the invention will be described with reference to the accompanying drawings, in which:

FIGURE 1 is a cross-sectional diagrammatic illustration of the various components of an embroidery machine, FIGURE 2 is a front elevation of part of the frame with exemplary two base bars for the shuttles, FIGURE 2A is a front view of the frame of FIGURE 2 at a reduced scale, FIGURE 3 is an elevation, partly in section, of the frame part as viewed in the direction of the arrow 3 in FIGURE 2, FIGURE 4 is an enlarged cross-section through the base bar of FIGURE 1 with a shuttle insert, FIGURE 5 is an elevation of an upper and lower picker on a picker rod, FIGURE 6 is a side elevation of a shuttle insert, FIGURE 7 is an end elevation of the shuttle insert of FIGURE 6, FIGURE 8 is a longitudinal section on the line VII—VII, FIGURE 6, FIGURE 9 is a front elevation of part of the needle frame with exemplary two base bars, FIGURE 10 is an elevation, partly in section, of the same frame part as viewed in the direction of the arrow 10 in FIGURE 9, FIGURE 11 is a section through a needle mounting, drawn to an enlarged scale, FIGURE 12 is a plan view of the needle mounting of FIGURE 11, FIGURE 13 is a front elevation of part of a punch frame with exemplary two base bars, FIGURE 14 is an elevation, partly in section, of this punch frame part as viewed in the direction of the arrow 14 of FIGURE 13, FIGURE 15 is a cross-section through a punch mounting, FIGURE 16 is a plan view, partly in section, of the punch mounting in FIGURE 15, FIGURE 17 is a sectional view of a modified punch bar, FIGURE 18 is a front elevation of part of the frame with thread regulating bars, FIGURE 19 is an elevation, partly in section, of the same frame part as viewed in the direction of the arrow 19 in FIG. 18, FIGURE 20 is a sectional view of a thread regulating bar, FIGURE 21 is a side view of the bar of FIGURE 20, and FIGURE 22 is a sectional view of a thread guide.

FIGURE 1 shows the general arrangement of the four frames for the four different types of embroidery tools in an embroidery machine. Frame 4 with base bars 1 for the shuttles is interchangeably located in a fixed position in the embroidery machine stand. Arranged next to the shuttle frame 4 in FIGURE 1 is frame 4' with base bars 30 for the needles. This frame 4' is in this instance mounted vertically in the embroidery machine stand and is operationally moved back and forth so that the needles pass through the section of fabric S stretched in the tenter (not shown) and penetrate into the recesses or channels in the shuttle base bar to form thread loops during their return motion. The shuttles pass through these loops with their bobbin threads to lock the loops in place on the reverse side of the fabric. A punched card may be used to control the reciprocal motion of the needle frame 4'. Next to the left of the needle frame 4' is frame 4'' with punch base bars 49. This frame 4'' is also operationally reciprocated in the same direction as the needle frame 4', thus permitting the punches to form perforations or holes in the tentered section of fabric in accordance with a particular pattern. Finally, frame 4''' with thread regulating base bars 61 is located in a fixed position. The following description deals with the construction of all four frames in detail.

Shuttle base bars 1 are at their opposite ends secured by bolts 2 and anchor members 3 to the parallel sides 4 of a rectangular frame which are joined by other parallel frame sides (FIG. 2A) to form a solid frame. The frame has approximately the same dimensions as the tenter (not shown) in which is stretched the section of fabric to-be-embroidered, with the opening in the frame extending in width and lengths over the width and length of the tentered fabric. Between the frame sides 4 are arranged as many parallel base bars 1 as may be accommodated between the other frame sides at a given spacing of the base bars from each other. The spacing of the base bars 1 is determined by the dimension of the individual embroidery pattern in the direction of the longitudinal frame sides 4. To allow adjustment of various pattern sizes for a variety of different patterns, the spacing of the base bars is adjustable by providing various additional anchor points 2a, 2b on the lower frame side 4.

In the embodiment shown in FIGURE 2 the upper anchor members 3 are adjustable about the various anchor points 2, 2a, 2b by means of bolts 22 and washers 23 in longitudinal slots 24 in the frame side 4, to thereby change the inclination of the base bars and thus the lateral offset of the patterns in the pattern rows in the longitudinal frame direction, while the lower anchor members 3 are firmly secured by bolts to the lower longitudinal frame side 4, and they may be secured in different positions at the holes 2a, 2b according to different pattern sizes. The base bars 1 may be extended either vertically or, as illustrated, inclined to the longitudinal frame sides 4.

To provide for further adjustment of the embroidery tools for various pattern sizes in the direction of the distance setting of the base bars, the embroidery tools on the base bars 1 are also adjustable relative to the needles and punches, as will be described. The shuttles A are located in shuttle guiding inserts 5 which, as shown in FIGURES 6 to 8, have two side walls 8 and 9 spaced from each other corresponding to the size of the shuttle. The two side walls 8 and 9 are joined together in accordance with the shuttle width by spacer arms or bolts 10.

On the base bars 1 are formed at varying distances grooves 11 in which the shuttle guiding inserts 5 may be releasably anchored in conformity with the various pattern heights. In accordance with these various pattern heights and adjustments for shuttle guiding inserts 5, the base bars 1 are provided with pre-shaped needle channels 6 and punch channels 7 so that, with appropriate adjustment of the shuttle guiding inserts, the embroidery tools may perform in conformity with the various pattern sizes.

By replacing the side walls 9 of the shuttle guiding inserts 5 by appropriately bent side walls, the shuttle guiding inserts can be used for shuttles of various sizes and thus in conjunction with bobbins of various sizes. If the shuttle guiding inserts are used on a base bar with a straight guide surface, as in the embodiment illustrated (FIG. 4), no further guide surfaces need be provided for the shuttle guiding inserts. However, if bars are used without such guide surfaces it will be necessary to provide special guide surfaces on the shuttle guiding inserts between the side walls 8 and 9.

Provided at a distance from the base bars 1 are picker rods 12 which are removably mounted in bearings 13 on the base bars. In the embodiment shown the picker rod 12 has a circular cross-section and the bearing 13 is accordingly provided with a circular bearing aperture. Within this bearing the picker rod 12 is operationally moved back and forth by a suitable reciprocal drive (not shown) under the control of a pattern or punched card, for example.

Projecting from the picker rod 12 adjacent the upper picker 14 and lower picker 15 are arms 16 with collars 17 at their ends. Mounted in the collars 17 is a bar 18 on which the pickers 14 and 15 are pivoted through intermediation of collars 19 and 20. By means of a spring-plunger arrangement 21 the pickers may assume either of two positions, namely an operating position as shown (FIG. 4) and another position for changing shuttles.

The collars 19 and 20 and the pickers 14 and 15 may be adjusted relative to the collars 17 on the picker rod 12 in accordance with the shuttle guiding insert settings. For adjustment purposes, a slidable and lockable sleeve (not shown) may be used in the same manner on the picker rod 12, carrying setting devices for the pivoted pickers.

FIGURES 9 to 12 show the needle arrangement. Needles 31 are arranged on base bars 30 which are straight and extend parallel to the shuttle base bars 1, corresponding in number and spacing with the base bars 1. Like the shuttle bars, the base bars 30 are adjustable in an outer fixed rectangular frame between parallel longitudinal sides 4' thereof by means of screws 22' and washers 23' in longitudinal slots 24' for fixing the angle of inclination of the bars, wherefore it is possible to coordinate the inclination angles of the various embroidery tools. The embroidery needles 31 are by a screw 32 releasably mounted in a gear segment 33 which is rotatably mounted on the base bar 30 by means of a screw 34. A ball 36, biased by a spring 35, is provided in the base bar 30 and engages in either of two recesses 37 in the segment 33 to locate the latter in the working position shown in FIGURE 11 or in a neutral position 90° apart from this setting. It is thus possible to bring into working position those embroidery needles which are needed to form a particular pattern (FIGURES 10 and 11), and to bring to the other, inoperative, position those needles which are not required for producing the particular pattern.

The teeth 38 of the segment 33 are in mesh with a rack 39. The rack 39 is carried by a holding device on a sliding rod 40 which is removably mounted in bearings 30' on the base bar 30. Depending from the rack 39 is a pin 41 which may be adjusted by a set screw 44 in a bore 42 in an arm projection 43 on the sliding rod 40 to permit disengagement of the rack 39 from the gear segment 33 for setting the latter and the needle 31 in the operating or the inoperative or rest position. After the needles required for producing a particular pattern have been set to the operating position and those needles not required have been set into the rest position, the racks 39 are remeshed with the gear segments 33 so that all operative needles will be operated simultaneously. The working needles may jointly be swung into any operating positions by the sliding rod 40 under the control of a punched pattern card, for example. The base bars 30 are each provided with a spring-loaded presser bar 45 for each needle point (FIG. 10) and with preformed bores 46 corresponding to the bores 7 in the base bars 1.

In the punch arrangement illustrated in FIGURES 13 to 17 straight base bars 49 extend parallel to the base bars 1 of the shuttles and base bars 30 of the needles, and are angularly adjustable between the parallel longitudinal sides 4″ of a rectangular frame by bolts 22″ in longitudinal slots 24″. The base bars 49, which are equal in number to the base bars 1, are provided with bearing plates 50 in which punches 51 are removably mounted. These plates 50 may suitably be mounted either on or in the base bars. The punches 51 are received in bores 52 in the bearing plates 50, the bores having enlarged counterbores 54 to accommodate springs 53 which force the punches 51, through their shoulders 55, against cams 56 that are mounted through brackets 57 on an adjusting rod 58 which, in turn, is removably mounted in bearings 49′ on the base bar 49. The cams 56 are adjustable by means of screws 59 so that the punches 51 project a greater or lesser distance toward the fabric to-be-embroidered, according to the setting of the cams, and thus penetrate varying distances into the tentered fabric and produce holes of various sizes for various patterns.

As shown in FIGURE 17, the punch 51 is mounted in a bearing 50 and, as a modification, may be adjusted with the aid of a set screw 60.

Thus, the punches are adjustable individually by the cams 56, and are moved jointly by a punched card, for example, via the adjusting rod 58.

The number of needles and punches is governed by the number of prepared needle and punch channels 6 and 7 in the shuttle base bars 1. The shuttles must be interchangeable, since in the exemplary machine at least 4″ are required per shuttle guiding insert. The needles and punches, on the other hand, need not be interchangeable, since provision can be made on the base bars, for one needle and one punch to each needle and punch channel, and the needles and punches which are not required can be set to the rest position.

FIGURES 18 to 22 show the thread regulating devices. Thread guides 62 and 63 are provided on both sides of a straight base or thread regulating bar 61 which extends parallel to the base bars 1, 30, and 49 of the shuttle, needle, and punch arrangement. The sloping or inclined position of the bar 61 can be achieved, exactly as with the other arrangements, on parallel longitudinal sides 4‴ of a rectangular frame by means of screws 22‴ and washers 23″ in longitudinal slots 24‴. Thread 66 passes through a thread deflection eye 64 and thread brake 65 to the thread guides 62 and 63 which feed it to the needles 31. Beyond the thread brake 65 the thread runs through a signalling contact 67 which lights up a signal lamp in the event of thread breakage. Brackets 68 are secured to the thread regulating bar 61 on both sides thereof and serve to guide picker bars 69. Carried by the picker bars 69 are racks 70 which mesh with gear segments 71 of the small and large thread regulators 62 and 63 and serve for adjustment of the latter. The thread guide and braking device operates in conventional manner.

While the same number of base bars 1, 30, and 49 are provided on the embroidery machine, only one thread regulating bar 61 needs to be provided for each two base bars in the other arrangements, so that by arranging the thread regulating elements on both sides of the bar 61 a considerable number of bars can be eliminated. Owing to the fact that only half as many thread regulating bars as base bars need to be employed for the other arrangements, more clearance space is provided for access to and working on the needle and drill base bars.

To allow changes in the distance between the base bars 30, 49, and 61 for various pattern sizes in accordance with the space between the base bars 1 for the shuttle A, various anchor points 2a′, 2b′, 2a″, 2b″, 2a‴, 2b‴ are provided for the anchor members 3′, 3″, 3‴ on the lower longitudinal frame sides 4′, 4″, 4‴.

In stead of adjustably arranging the base bars 1, 30, 49, 61 in the frames 4, 4′, 4″, 4‴ and the embroidery tools on the base bars for various pattern sizes, it is also feasible to provide for interchangeable mounting in the machine stand of different sets of four frames in each of which the base bars are at various fixed spacing and also carry the embroidery tools at the appropriate distances from each other.

The base bars 1, 30, and 49 between the longitudinal frame sides must have adequate cross-section to ensure that they remain completely rigid under the stresses of the working embroidery tools and the rapid reciprocal movements involved, thus ensuring that the needles 31 and punches 51 always penetrate accurately into the needle and punch channels 7 and 46.

As already mentioned, the present machine provides for simultaneous embroidering of the total area of the tentered fabric. In particular, the present machine provides for simultaneous embroidering of a design pattern arranged in rows that extend longitudinally over the entire length of the tentered fabric and are laterally spaced from each other throughout the entire width of the tentered fabric.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A machine for embroidering a tentered fabric of a given width and length with a design pattern arranged in laterally spaced rows extending lengthwise of the tentered fabric, which comprises means for tentering the fabric and a plurality of tool bank frames in spaced planes parallel to each other and to the plane of the tentered fabric in its embroidering working position, with each frame having an opening in line with, and extending in width and length over the width and length of, the plane of the tentered fabric in its embroidering working position; base bars mounted on each of said frames and extending in said plane thereof in and over the lengths of said opening therein for disposition in parallelism with said pattern rows; and embroidering tools of a number of different types equal to the number of said frames, said tools being mounted on said base bars in said frames so that all tools of the same type are carried by one frame.

2. An embroidery machine as in claim 1, in which said frames are rectangular and means are provided for mounting said base bars with their opposite ends on opposite sides of the respective frames.

3. An embroidery machine as in claim 2, in which said mounting means provide for angular adjustability of said base bars in said planes of the respective frames.

4. An embroidery machine as in claim 2 in which said mounting means provide for adjustability of said base bars to and from each other in the planes of the respective frames for variable spacing of said base bars from each other in each frame.

5. An embroidery machine as in claim 1, in which one type of said embroidering tools are shuttle guiding inserts removably mounted on the respective base bars, and which further comprises picker rods and pickers thereon for the shuttles in said inserts, with the base bars mounting the shuttle guiding inserts having guide means in which said picker rods are reciprocable.

6. An embroidery machine as in claim 5, in which said pickers are pivoted on said picker rods for turning movement into and from operative relation with shuttles in said shuttle guiding inserts.

7. An embroidery machine as in claim 5, in which means are provided for adjusting said pickers on said picker rods longitudinally thereof.

8. An embroidery machine as in claim 1, in which one type of said embroidering tools are shuttle guiding inserts each having opposite side walls and longitudinally spaced connecting arms holding said side walls in spaced relation to each other, with said side walls extending to opposite sides of said arms to form at one side thereof a shuttle receptacle, the base bars mounting said shuttle guiding inserts having a longitudinal surface with longitudinally spaced recesses therein in which said arms of said inserts are received so that the latter are locked to the respective base bars against longitudinal movement thereon and said surfaces of the respective base bars form the bottoms of the shuttle receptacles of said inserts, and the side walls of said inserts on the side of said arms opposite to said one side thereof straddling the respective base bars to hold said inserts against lateral movement thereon.

9. An embroidery machine as in claim 1, in which one type of said embroidering tools are needles, and which further comprises turnably mounted gear segments on the base bars mounting the needles, with said needles being attached to and turnable with said gear segments, said needle mounting base bars having guide means, rods reciprocable in said guide means, and racks carried by said rods and in mesh with said gear segments for shifting the latter into different needle positions.

10. An embroidery machine as in claim 9, which further comprises means for adjusting any of said racks on said rods into positions in which it is in and out of mesh with the associated gear segment, respectively.

11. An embroidery machine as in claim 1, in which one type of said embroidering tools are punches with tapered ends, and which further comprises bearings in and guide means on the base bars mounting said punches, with said punches being slidable in said bearings, rods slidable in said guide means on the punch mounting base bars, and cams on said rods cooperating with said punches, respectively, for lengthwise adjustment of the latter in their bearings on moving said rods.

12. An embroidery machine as in claim 11, which further comprises means mounting each of said cams on said rods for individual adjustability to thereby individually lengthwise adjust the associated punch in its bearing.

13. An embroidery machine as in claim 1, in which first, second, third and fourth types of said embroidering tools are shuttle guide inserts, needles, punches and thread-regulating devices, respectively, with the base bars mounting said first, second and third types of embroidering tools being laterally spaced from each other in the planes of their respective frames the same as said pattern rows, and the remaining base bars mounting said fourth types of embroidering tools on opposite sides thereof and being spaced from each other in the plane of the respective frame at a distance equal to twice the spacing of said pattern rows.

References Cited
UNITED STATES PATENTS

| | | | |
|---|---|---|---|
| 653,782 | 7/1900 | Schoenfeld | 112—89 |
| 952,858 | 3/1910 | Zahn | 112—83 |
| 1,024,911 | 4/1912 | Schoenfeld | 112—95 |
| 1,057,558 | 4/1913 | Keller | 112—89 |
| 1,145,951 | 7/1915 | Weller | 112—83 |
| 1,299,145 | 4/1919 | Diem-Beutler | 112—83 |
| 2,070,914 | 2/1937 | Neubert et al. | 112—83 |

JORDAN FRANKLIN, *Primary Examiner.*

A. R. GUEST, *Assistant Examiner.*